United States Patent
Olarig et al.

(10) Patent No.: US 12,038,818 B2
(45) Date of Patent: *Jul. 16, 2024

(54) DEVICE AND METHOD FOR VERIFYING A COMPONENT OF A STORAGE DEVICE

(71) Applicant: Samsung Electronics Co., Ltd., Suwon-si (KR)

(72) Inventors: Sompong Paul Olarig, Pleasanton, CA (US); Xuebin Yao, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,020

(22) Filed: Jan. 30, 2023

(65) Prior Publication Data
US 2023/0168984 A1 Jun. 1, 2023

Related U.S. Application Data

(63) Continuation of application No. 16/837,942, filed on Apr. 1, 2020, now Pat. No. 11,593,240.

(Continued)

(51) Int. Cl.
*G06F 11/22* (2006.01)
(52) U.S. Cl.
CPC ...... *G06F 11/2289* (2013.01); *G06F 11/2221* (2013.01)
(58) Field of Classification Search
CPC .. G06F 11/2289; G06F 11/2221; G06F 21/55; G06F 13/1668; G06F 13/4068;

(Continued)

(56) References Cited

U.S. PATENT DOCUMENTS 6,484,128 B1  11/2002  Sekiya et al.
7,845,016 B2  11/2010  Diab et al.
(Continued)

OTHER PUBLICATIONS

Moorison, Paul, How New Storage Technologies Get a Boost from Hardware Emulation, Veloce Insights Blog, https://blogs.mentor.com/emulation/blog/2017/09/26/how-new-storage-technologies-get-a-boost-from-hardware-emulation/, 6 pages.

(Continued)

*Primary Examiner* — James C Kerveros
(74) *Attorney, Agent, or Firm* — Lewis Roca Rothgerber Christie LLP

(57) ABSTRACT

A storage device configured for hardware verification is disclosed. The storage device comprises a first hardware component comprising a connector and a first verification logic. The first validation logic is configured to detect a criterion and generate a first signal via the connector in response to detecting the criterion. The storage device also comprises a second hardware component coupled to the first hardware component via the connector. The second hardware component comprises a second validation logic, where the second validation logic is configured to monitor and receive the first signal via the connector. In response to receiving the first signal, the second validation logic is configured to compare the received first signal to an expected signal and generate a result. The storage device is configured to take an action in response to the result.

22 Claims, 7 Drawing Sheets

Related U.S. Application Data

(60) Provisional application No. 62/975,616, filed on Feb. 12, 2020.

(58) Field of Classification Search
CPC ............. G06F 2213/0026; G06F 21/78; G06F 3/0653; G06F 13/4221; G06F 21/44; H04W 12/12; H04L 63/14
USPC .......................................................... 714/734
See application file for complete search history.

(56) References Cited

U.S. PATENT DOCUMENTS

| | | | |
|---|---|---|---|
| 7,877,788 B1* | 1/2011 | Topp .................... | G06F 21/44 726/17 |
| 7,917,818 B2 | 3/2011 | Niijima | |
| 8,607,103 B2* | 12/2013 | Owaki .................. | G06F 11/277 714/715 |
| 8,875,280 B2 | 10/2014 | Dang et al. | |
| 9,524,108 B2 | 12/2016 | Hia et al. | |
| 2007/0297417 A1* | 12/2007 | Cohen .................... | H04L 45/04 370/428 |
| 2010/0097952 A1 | 4/2010 | McHenry et al. | |
| 2014/0075255 A1 | 3/2014 | Lee et al. | |
| 2015/0095712 A1 | 4/2015 | Han | |
| 2015/0304843 A1* | 10/2015 | Hillyard ................ | G06F 8/654 726/5 |
| 2016/0293274 A1 | 10/2016 | Schuh et al. | |
| 2017/0220499 A1 | 8/2017 | Gray | |
| 2018/0006820 A1 | 1/2018 | Arasu et al. | |
| 2018/0091358 A1 | 3/2018 | Sasaki et al. | |
| 2018/0196103 A1 | 7/2018 | Champoux et al. | |
| 2018/0373664 A1 | 12/2018 | Vijayrao | |
| 2019/0042480 A1 | 2/2019 | Khatib Zadeh et al. | |
| 2019/0129882 A1 | 5/2019 | Pudipeddi et al. | |
| 2019/0140852 A1 | 5/2019 | Kreft | |
| 2019/0155519 A1 | 5/2019 | Breakstone et al. | |
| 2019/0278720 A1 | 9/2019 | Olarig et al. | |
| 2021/0248049 A1* | 8/2021 | Olarig .................. | H04W 12/12 |
| 2021/0326459 A1* | 10/2021 | Chivukula ............ | H04L 9/3226 |

OTHER PUBLICATIONS

Moorthy, T., Gopalakrishnan, S. IO and data management for infrastructure as a service FPGA accelerators. *J Cloud Comp* 6, 20 (2017). https://doi.org/10.1186/s13677-017-0089-9, 23 pages.

* cited by examiner

DEVICE AND METHOD FOR VERIFYING A COMPONENT OF A STORAGE DEVICE

CROSS-REFERENCE TO RELATED APPLICATION(S)

The present application is a continuation of U.S. patent application Ser. No. 16/837,942 filed Apr. 1, 2020, which claims priority to and the benefit of U.S. Provisional Application No. 62/975,616, filed Feb. 12, 2020, entitled "SYSTEMS, METHODS, AND APPARATUS FOR PROVIDING LOCK-IN FEATURES FOR MODULAR STORAGE DEVICES," the entire content of each of which is incorporated herein by reference.

FIELD

One or more aspects of embodiments of the present disclosure relate to storage devices, and more particularly, to verifying whether a component of a storage device is an authorized and/or verified component.

BACKGROUND

It may be desirable to use a computational storage device (e.g., a solid state drive (SSD) with an embedded processor or Field Programmable Gate Array (FPGA)), for various data processing tasks, as such a storage device may help provide efficient and cost-effective data processing solutions. For example, a computational storage device may provide a platform for performing at least a portion of the data processing functions that may otherwise be performed by a host CPU processor, within the storage device itself.

Thus, it is desirable to have a system and method for quickly determining whether one or more components of a computational storage device are verified components.

SUMMARY

Embodiments of the present disclosure are directed to a storage device configured for hardware verification. The storage device comprises a first hardware component comprising a connector and a first verification logic. The first validation logic is configured to detect a criterion and generate a first signal via the connector in response to detecting the criterion. The storage device also comprises a second hardware component coupled to the first hardware component via the connector. The second hardware component comprises a second validation logic, where the second validation logic is configured to monitor and receive the first signal via the connector. In response to receiving the first signal, the second validation logic is configured to compare the received first signal to an expected signal and generate a result. The storage device is configured to take an action in response to the result.

According to one embodiment, the first hardware component includes at least one of a field gate programmable array (FPGA) or an application-specific integrated circuit, and the second hardware component includes non-volatile memory.

According to one embodiment, the expected signal is associated with an identifier stored in memory of the second hardware component.

According to one embodiment, the connector is a connector supporting a peripheral component interconnect express (PCIe) protocol.

According to one embodiment, the criterion is detecting start of a reset period.

According to one embodiment, the first signal is provided over a preset pin of the connector.

According to one embodiment, the result comprises an indication of a match of the received first signal with the expected signal, and the action comprises enabling an acceleration feature of the storage device.

According to one embodiment, the result comprises an indication of a mismatch of the received first signal with the expected signal, and the action comprises disabling an acceleration feature of the storage device.

According to one embodiment, the result comprises an indication of a mismatch of the received first signal with the expected signal, and the action comprises displaying a notification on a display device.

According to one embodiment, the second hardware component is coupled to a host via a second connector.

Embodiments of the present disclosure are also directed to a method for hardware verification by a storage device. The method comprises detecting, via a first verification logic in a first hardware component, a criterion; generating, via a connector in the first hardware component, a first signal in response to detecting the criterion; monitoring and receiving, by a second validation logic in a second hardware component, the first signal, the second hardware component being coupled to the first hardware component via the connector; and comparing, by the second validation logic, in response to receiving the first signal, the received first signal to an expected signal, and generating a result, wherein the storage device is configured to take an action in response to the result.

As a person of skill in the art should recognize, embodiments of the present disclosure provide a mechanism for quickly determining whether one or more components of a computational storage device are verified components. This may help avoid, for example, unpredictable behavior or failure of the device due to use of an unverified component.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1A:
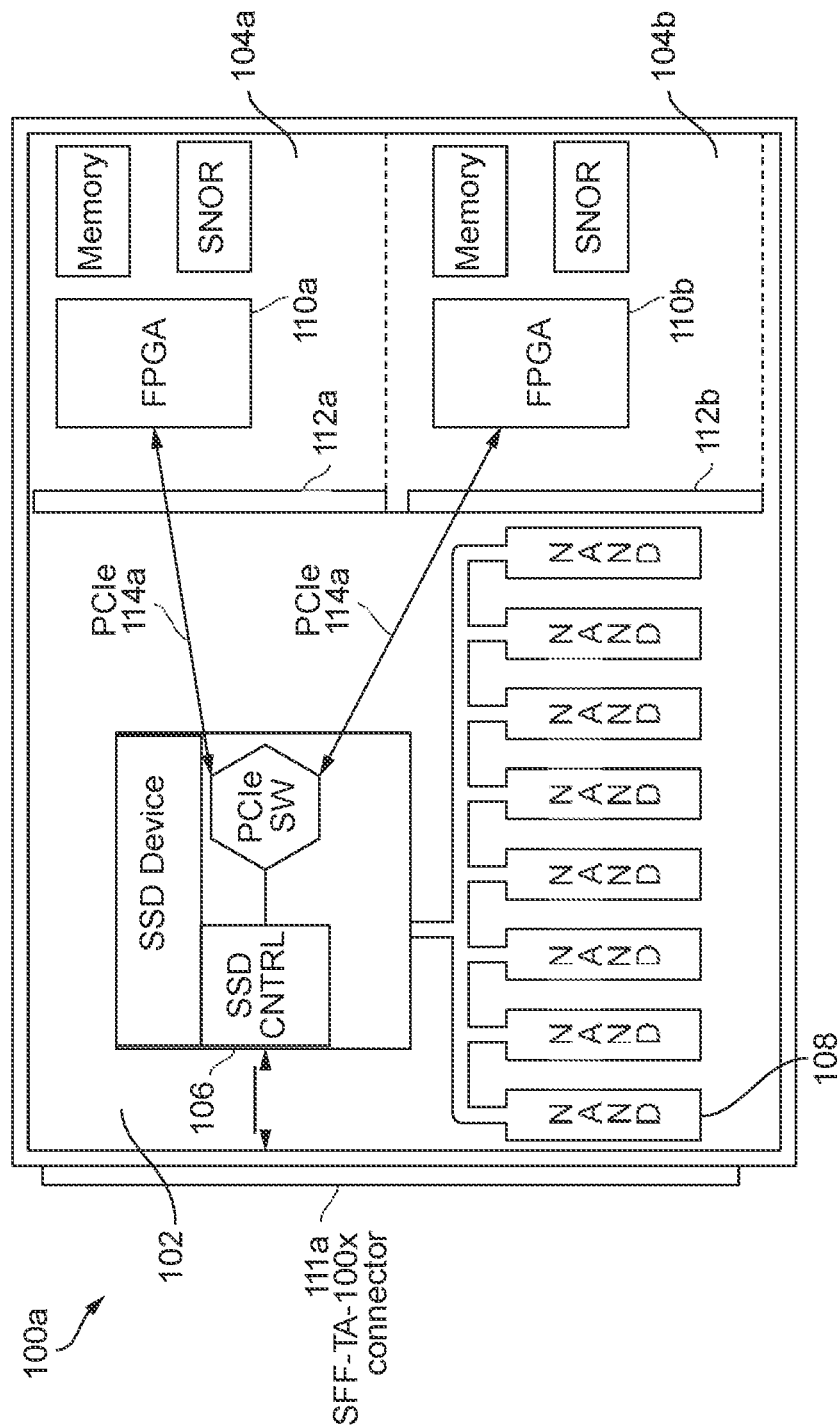
FIGS. 1A-1C are block diagrams of exemplary computational storage devices with modular components according to one exemplary embodiment.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

A computational storage device may at times be modular in design or construction. In such a case, the computational storage device may be constructed from different removable components including, for example, a storage component (e.g. solid state memory) and a processing component (e.g. a field programmable gate array (FPGA). The modular components of the computational storage device may be obtained from different vendors. As such, there is a likelihood that one may attempt to construct the computational storage device from unauthorized/unqualified vendors which may compromise the quality of the constructed computational storage device.

In general terms, embodiments of the present disclosure are directed to a system and method for detecting, via hardware, whether a storage device (e.g., an SSD) or a processor device (e.g., an FPGA) forming part of a computational storage device, is an authorized component. The verification process may be performed, for example, during a reset of all or a portion of the computational storage device. The verification process may be performed, for example, to verify that the device has authorized components before the FPGA has down loaded an image and/or bit-file that configures the FPGA to operate in a predetermined manner.

In one embodiment, the verification can be conducted via a hardware verification logic included in the processor device and in the storage device. The hardware verification logic may be configured to utilize a reserved pin of a connector (e.g., a U.2 connector, or the like) that connects the storage device to the processor device. In one embodiment, the reserved pin can include pin E6 pin of the U.2 connector.

According to one embodiment, hardware verification by an initiator of a target occurs during a reset period. The initiator may be an initiator as described by the NVMe standard, although embodiments of the disclosure are not limited thereto. The initiator may be the processor device, with the target being the storage device, or vice versa. The reset period may occur, for example, when a device is inserted into a slot of a computer system without stopping or shutting down the system, or when the entire computer system is rebooted. During the reset period, the initiator may be configured to monitor the reserved pin for determining whether traffic is detected through the pin. In one embodiment, an authorized target drives the reserved pin with a verification ID (also referred to as a verification signal) that notifies the initiator that the target is an authorized device. The verification ID may include, for example, a predefined waveform pattern/signal. In response to verifying that the target is an authorized device, the initiator may enable certain functionalities of the device that would not be enabled without such verification. The functionalities may include, for example, downloading proprietary bit files and/or enabling certain acceleration features.

Figure 1B:
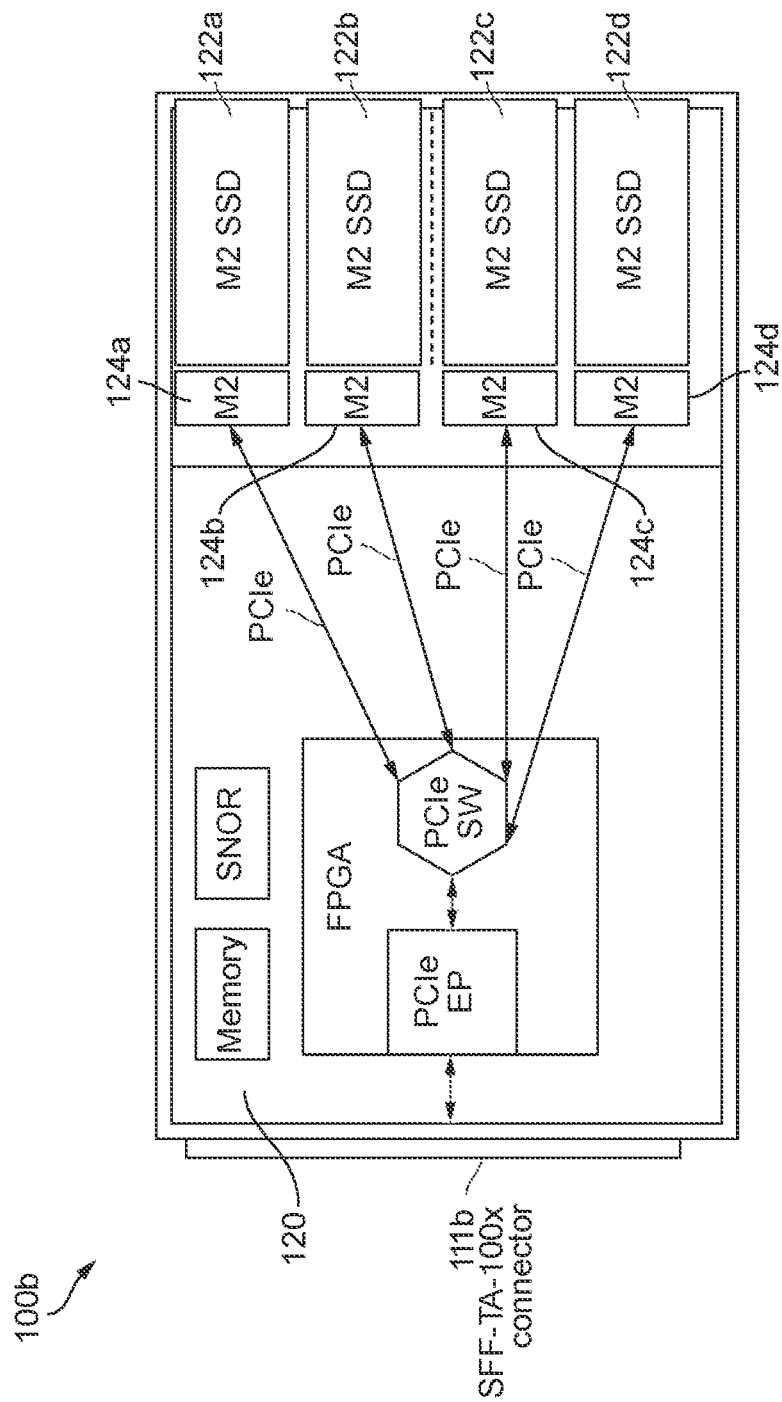
Figure 1C:
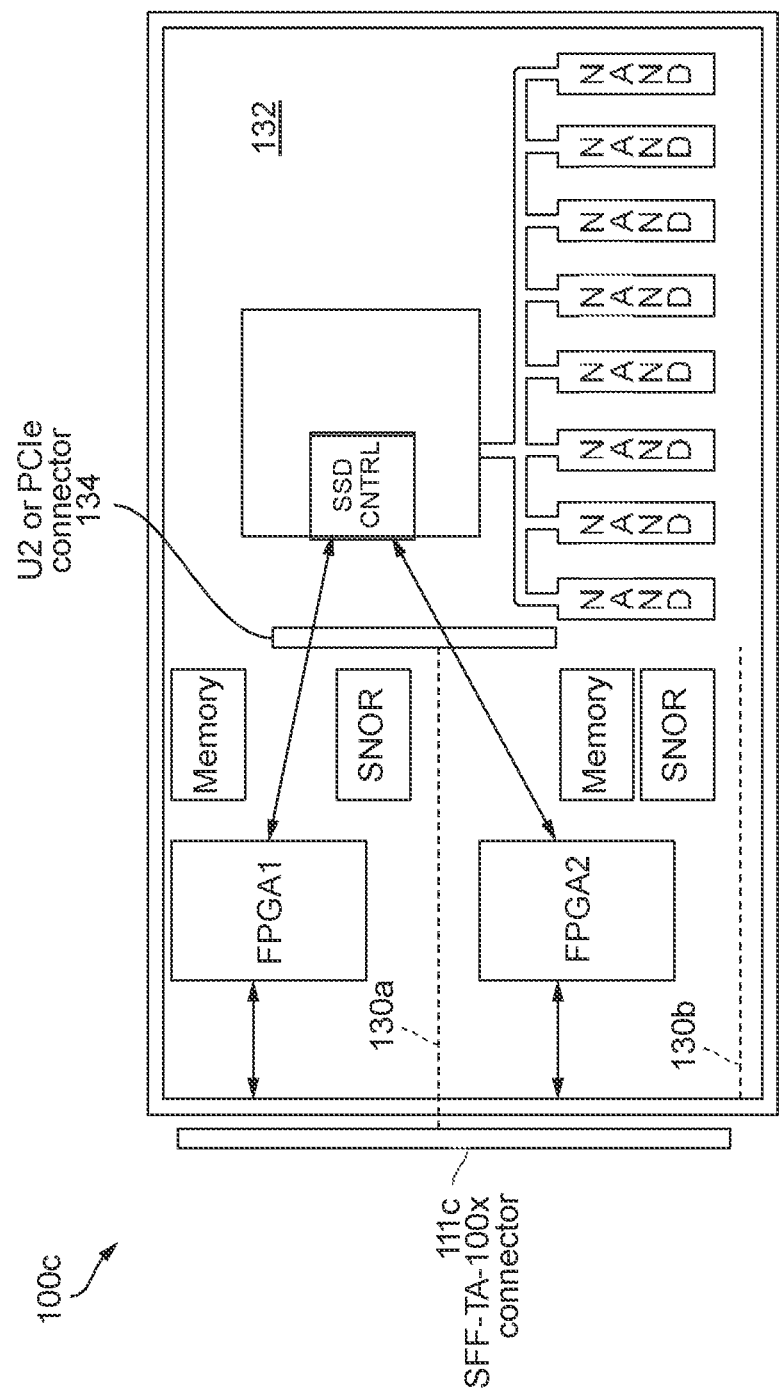

FIGS. 1A-1C are block diagrams of exemplary computational storage devices 100a-100c (collectively referenced as 100) with modular hardware components according to one exemplary embodiment. The various modular components described herein may also be referred to as hardware components.

The computation storage device 100a of FIG. 1A includes a modular storage component 102 that may be removably coupled to one or more processor components 104a, 104b. The modular storage component 102 may be, for example, an SSD including a storage controller 106 and various flash drives 108. The SDD may be, for example, a Non-Volatile Memory express (NVMe) SSD, an NVMe over Fabrics (NVMe-oF)-compatible Ethernet SSD (eSSD), or any other suitable persistent (non-volatile) memory device.

The one or more processor components 104a, 104b may include, for example, one or more FPGAs 110a, 110b. In some embodiments, a GPU (graphics processing unit), TPU (tensor processing unit), and/or another ASIC (application-specific integrated circuit) conventional in the art may be used in addition or in lieu of the FPGA.

In the example of FIG. 1A, the modular storage component 102 connects to a host device over a connector 111a, which may be, for example, a small-form-factor-technology-affiliate-100x (SFF-TA-100X) connector (where X is an integer value equal to 2, 6, 7, 8, etc.). A user may create a computational storage device of choice by adding the one or more processor components 104a, 104b to the storage component 102 as desired.

In one embodiment, the modular storage component 102 connects to the one or more processor components 104a, 104b, over connectors 112a, 112b. The connectors 112a, 112b may be standard connectors such as, for example, U.2, M.2, Next Generation Small Form Factor (NF1), or Enterprise & Data Center SSD Form Factor (EDSFF) connectors. Communication between the storage component 102 and the one or more processor components 104a, 104b may occur, for example, via the connectors 112a, 112b, over PCIe links 114a, 114b.

The computational storage device 100b in the example of FIG. 1B includes a modular processor component 120 that may be removably coupled to one or more modular storage components 122a-122d (collectively referenced as 122), over a connector 124a-124d. The processor device in the modular processor component 120 may be, for example, an FPGA, and the one or more modular storage components 122 may be, for example, an SSD. In the example of FIG. 1B, the processor component 120 connects to the host device over a connector 111b. A user may create a computational storage device of choice by adding the one or more modular storage components 122 to the processor component 120 as desired.

The computational storage device 100c of FIG. 1C can be similar (but not necessarily identical) to the computational storage device 100a of FIG. 1A, except that dual processor components 130a, 130b are coupled to a storage component 132 over a connector 134 having a dual port configuration. The connector may be, for example, a U.2 connector or a PCIe interface. In the example of FIG. 1C, the processor components 130a, 130b connect to the host device over a connector 111c. A user may design a computational storage device of choice by adding the modular storage component 132 of choice to the processor components 130a, 130b as desired.

In the modular configuration of the computational storage device 100 in the examples of FIGS. 1A-1C, it is possible that a particular modular component may be obtained from an unauthorized/unqualified vendor that may, for example, compromise the quality (e.g., performance) of the computational storage device. It may be desirable, therefore, to have a system and method for determining whether one or more components of the computational storage device are verified components. Once an added modular component is verified to be an authorized component, certain acceleration features may be enabled, such as, for example, compression and/or encryption functionalities by the computational storage device.

In one embodiment, in the event that the added modular component cannot be verified, the computational storage device may be configured to download or otherwise receive, for example, standard FPGA bit files without downloading proprietary FPGA bit files. This may allow, for example, the computational storage device to function as it normally would, but without the acceleration capabilities. The device can additionally transmit a message to inform a user or application that the added device is unauthorized.

Figure 2:
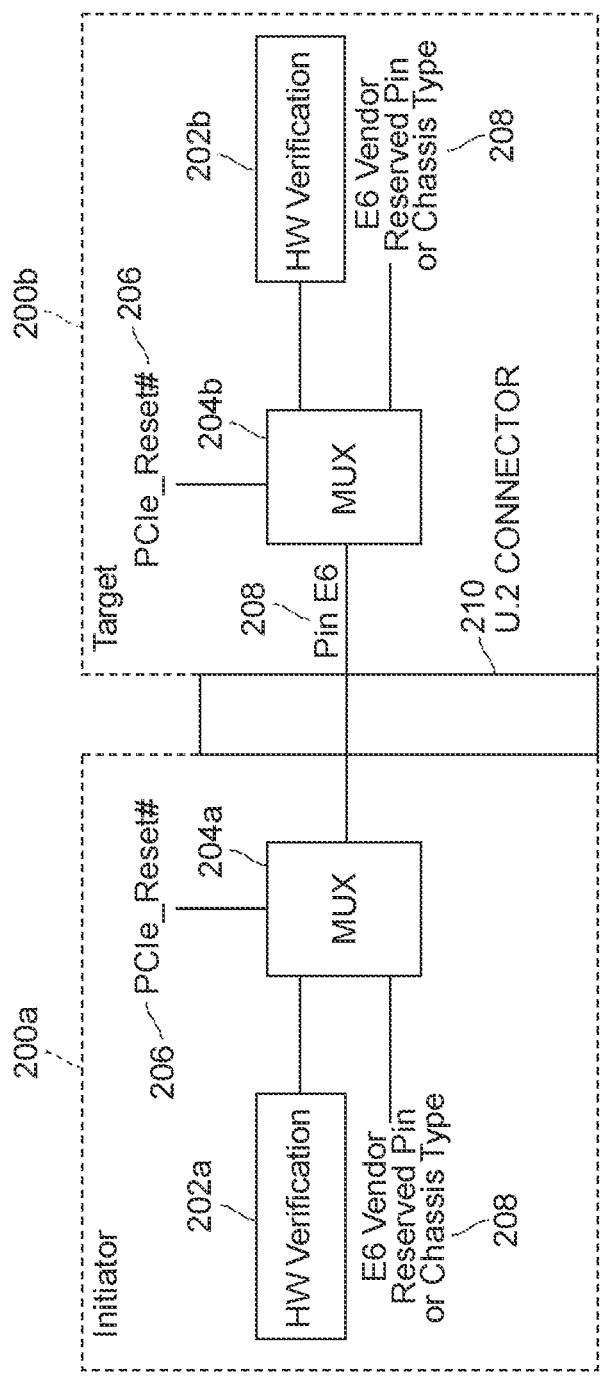
FIG. 2 is a block diagram of verification modules for performing hardware verification of a modular component of a computational storage device according to one exemplary embodiment.

FIG. 2 is a block diagram of verification modules 200a, 200b (collectively referenced as 200) for performing hardware verification of a modular component of a computational storage device according to one exemplary embodiment. In one embodiment, the verification modules 200 are installed in an initiator component and in a target component. The verification modules may respectively include hardware verification logics 202a, 202b (collectively referenced as 202) that may be described, for example, as state machines.

In one embodiment, the verification modules 200 further include multiplexors 204a, 204b (collectively referenced as 204). Input to a particular one of the multiplexors 204 may be provided by the corresponding hardware verification logic 202 and by a reserved pin 208. In one embodiment, the reserved pin 208 is a reserved pin of a connector 210 (similar to connector 112, 124, 134). When the connector is implemented as a U.2 connector, the pin 208 may be pin "E6" that is defined as a reserved (RSVD) pin (or any other suitable pin). Although the U.2 connector is used as an example of a connector for connecting the processor module to the storage module, a person of skill in the art should recognize that the connector may also be an M.2 or NF1 connector having one or more reserved pins.

Outputs of the multiplexors 204a, 204b are coupled to the reserved pin 208 of the connector 210. A reset pin 206 may control the multiplexors 204a, 204b so outputs of the hardware verification logic 202 are selected during a reset period when the reset pin 206 is asserted (e.g. asserted low). When the reset pin 206 is de-asserted, the multiplexors transmit a chassis type through the reserved pin 208.

In one embodiment, the hardware verification logic 202 in the initiator and target devices initiate a verification cycle in response to a reset by a host processor. In one embodiment, the reset drives the reset pin 206 to be asserted low, causing the multiplexor 204 to select the hardware verification logic 202 to communicate via the reserved pin 208 of the connector 210 during the reset.

In one embodiment, the initiator is a device that is installed first on the host computer that seeks verification of the target, which may be a later-added modular component. Either the processor component or the storage component may be the initiator or the target. In one example, the initiator is the processor component 120, 130 of FIGS. 1B, 1C, and the target is the storage component 122, 132 of FIGS. 1B, 1C. In another example, the initiator is the storage component 102 of FIG. 1A and the target is the processor component 110 of FIG. 1A.

Assuming, for illustration purposes, that the initiator is an FPGA and the target is an SSD, the initiator may execute the hardware verification logic 202a including, for example, a verification identifier (ID), from a non-volatile memory device upon the occurrence of a reset. The non-volatile memory device may be, for example, an EEPROM (electrically erasable programmable read-only memory). The download may be due to the fact that the reset wipes out any logic programmed in the FPGA.

In one embodiment, the hardware verification logic 202a of the initiator monitors the reserved pin 208 during the reset period for activity on the pin. The monitoring may continue until the reserved pin is no longer asserted low.

Turning now to the target, as with the initiator, the multiplexor 204b selects the hardware verification logic 202b in the SSD for communicating with the FPGA over the connector 210 in response to the reset pin 206 being asserted low. In one embodiment, given that the target is the device to be verified, the hardware verification logic 202b drives the reserved pin 208 of the connector 210 with the verification ID during the reset period. In one embodiment, the hardware verification logic 202b of the target receives the verification ID that is to be transmitted via the reserved pin 208 from the FPGA or the host processor, or the like.

The hardware verification logic 202a of the FPGA detects the verification ID on the monitored reserved pin 208, and compares the received verification ID with an expected verification ID downloaded from the memory device. If the verification IDs fail to match, verification of the target SSD fails. The hardware verification logic 202a of the FPGA may write the results of the failed verification process to a defined register location. For example, a result of "not verified" may be written to the defined register location. If, however, the verification is successful, the hardware verification logic 202a of the FPGA may be configured to write a "verified" status to the defined register location.

In one embodiment, the FGPA may check the results of the verification in the defined register location prior to taking certain actions. Such actions may be, for example, to download or not, a proprietary bit file in addition to a standard bit file, during a boot sequence, and/or enable or disable certain acceleration features of the FPGA including compression, encryption, and the like. Other acceleration features that may be enabled or disabled depending on the verification results may include, for example, enabling/disabling a double data rate fourth generation synchronous dynamic random-access (DDR4) channel (if supported), enabling/disabling a high bandwidth memory (HBM) (if present), and or the like.

Figure 3:
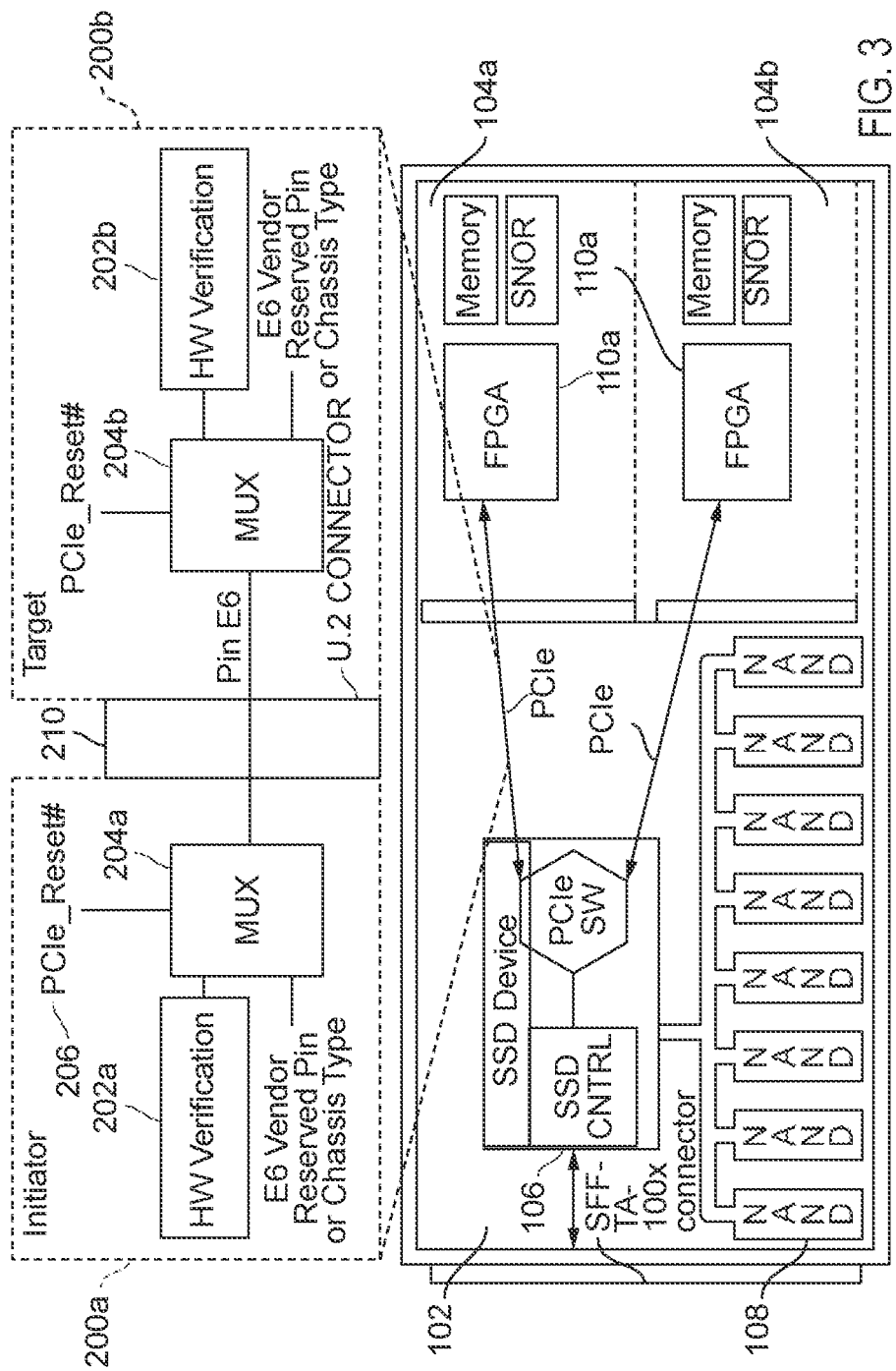
FIG. 3 is a block diagram of the exemplary computational storage device of FIG. 1A configured with the verification modules of FIG. 2, according to an exemplary embodiment.

FIG. 3 is a block diagram of the exemplary computational storage device of FIG. 1A configured with the verification modules 200a, 200b of FIG. 2, according to an exemplary embodiment. The hardware verification logic 202a that is executed by the storage component 102 may be incorporated into an initialization logic that is run by the storage controller during cold reboots. The hardware verification logic 202a that is executed by the processor component 104 may be stored in a non-volatile memory, such as an EEPROM, and loaded to the FPGA 110 upon a reset.

In one embodiment, the multiplexors 204a, 204b are respectively incorporated into the storage component 102 and the processor component 104. In some embodiments, the multiplexors 204a, 204b may reside outside of the storage and/or processor components.

Figure 4:
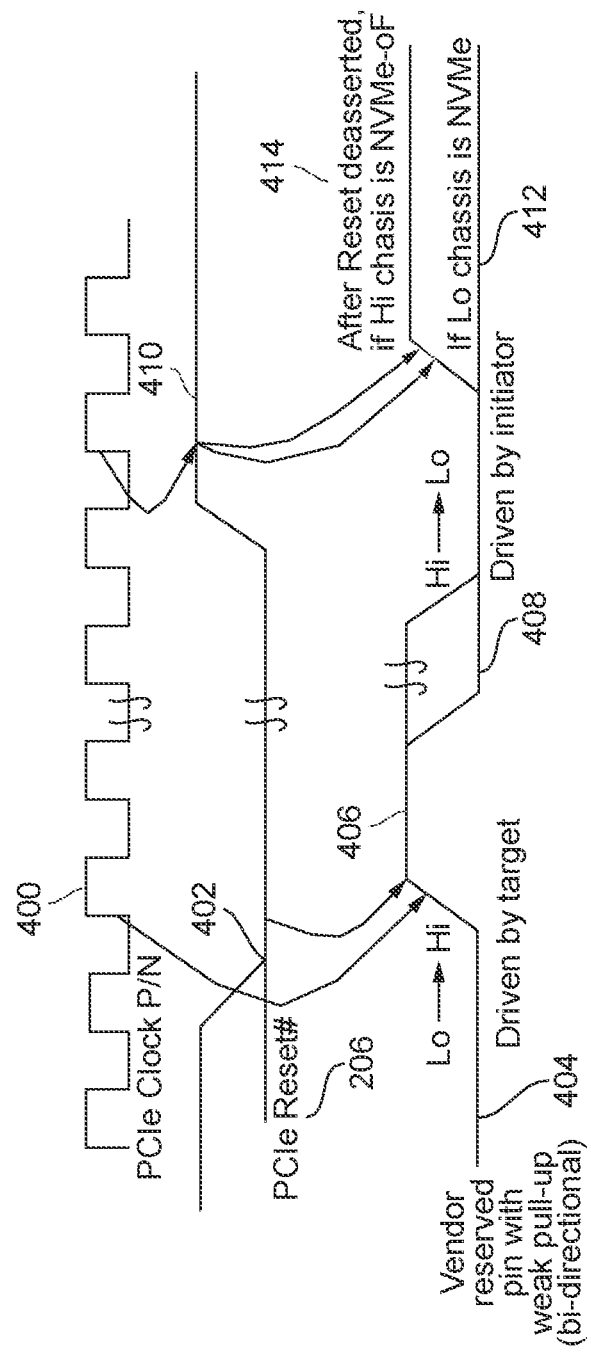
FIG. 4 is an exemplary signaling diagram according to one exemplary embodiment.

FIG. 4 is an exemplary signaling diagram of the verification modules 200 according to one exemplary embodiment. At a rise of a particular clock cycle 400, the reset pin 206 is asserted low 402, and a reset period begins. The reset period may last, for example, several seconds. In one embodiment, no activity of the rebooted device occurs during the reset period, and the lack of activity is utilized for performing verification by the initiator of the target device. In one example, the hardware verification logic 202*b* in the target device causes the reserved pin 208 to be driven from a low state 404 to a high state 406 as many times as needed based on a predetermined pattern dictated by the verification ID. In one embodiment, a minimum requirement may be that the pin be driven from a low state to a high state for at least one clock period, and from the high state to the low state for at least another clock period.

The initiator monitoring the reserved pin 208 during the reset period receives the verification ID. In one embodiment, a fixed counter is invoked by the initiator when a first signal is received on the reserved pin 208. When the fixed counter reaches a particular value corresponding to the size of the expected verification ID, the initiator concludes that all of the verification ID has been received. Further, the initiator may cause the reserved pin 208 (not shown) to be driven to a low state 408. This may occur, for example, prior to expiration of the reset period. The initiator compares the received verification ID against the expected verification ID for determining a match.

In one embodiment, when the reset pin 206 is no longer asserted 410 (e.g. at the expiration of the reset period), the reserved pin 208 serves to provide a chassis type. For example, the reserved pin 208 in a low state may indicate a chassis type of NVMe, and the reserved pin in a high state may indicate a chassis type of NVMe-oF.

Figure 5:
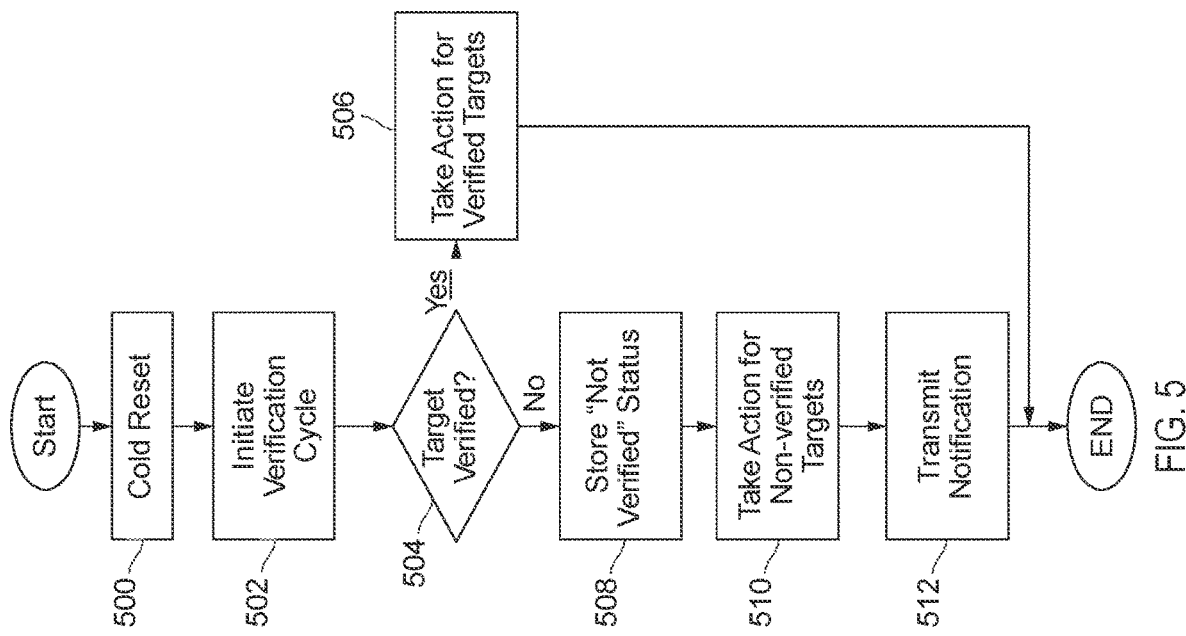
FIG. 5 is a flow diagram of a hardware verification process according to one exemplary embodiment.

FIG. 5 is a flow diagram of a hardware verification process according to one exemplary embodiment. It should be understood that the sequence of steps of the process is not fixed, but can be altered into any desired sequence as recognized by a person of skill in the art.

In act 500, a reset is asserted by the host processor for a particular slot (e.g. in response to a host insertion of a device into the slot), or for the entire system.

In act 502, the hardware verification logic 202*a*, 202*b* in the initiator and target is initiated in response to the reset. In one embodiment, a determination as to which modular component of the computational storage device is the initiator, and which modular component is the target, may depend on the device that connects first to the host device. In one embodiment, configuration or the module as the initiator or target may be via a programmable pin.

In act 504, the hardware verification logic 202*a* of the initiator monitors the reserved pin 208 for determining whether the target is an authorized target. In one embodiment, the hardware verification logic 202*a* of the initiator compares the signals received via the reserved pin 208, to the verification ID expected by the initiator. If the received signals match the expected verification ID, the target may be deemed to be authorized, and a "verified" status may be stored in a particular register location.

In act 506, in response to verifying the target, the initiator takes one or more actions that are allowed to be performed with authorized targets. Such actions may include, for example, downloading FPGA bit files that are proprietary to the vendor providing the FPGA (in addition to the standard FPGA bit files) during a boot sequence, and continuing a PCIe link training sequence to establish a high speed I/O connection between the initiator and the target devices. Other actions may include enabling acceleration features of the processor component, enabling a DDR4 channel, and/or enabling a high bandwidth memory.

Referring again to act 504, if the hardware verification logic 202*a* of the initiator is unable to verify the target (e.g. due to a mismatch of the received verification ID with the expected verification ID), the hardware verification logic 202*a* stores a "not verified" status in the particular register location in act 508.

In act 510, the initiator takes one or more actions in response to the target component failing the verification. Such actions may include, for example, proceeding with the boot sequence by downloading standard FPGA bit files without downloading a proprietary FPGA bit file, disabling certain acceleration features of the FPGA (e.g. compression, encryption, etc.), disabling the DDR4 channel, and/or disabling the HBM if present. In this manner, the computational storage device with the un-verified target component can be functional, but with limited capabilities.

In one embodiment, a notification is transmitted in act 512 for informing a user that the target device is not an authorized device. The notification may be displayed to the user, for example, as part of the functionality of the BIOS (Basic Input Output System).

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for verifying components of a modular computational storage device have been specifically described and illustrated herein, many modifications and variations will be apparent to those skilled in the art. Accordingly, it is to be understood that a system and method for verifying components of a modular computational storage device constructed according to principles of this disclosure may be embodied other than as specifically described herein. The disclosure is also defined in the following claims, and equivalents thereof.

What is claimed is:

1. A system comprising:
a first component comprising a connector having a first connection, the first component configured to generate a first signal based on a second connection being in a first state, the first signal for being transmitted via the first connection of the connector, wherein the first connection is configured to transmit a second signal based on the second connection being in a second state; and
a second component coupled to the first component via the connector, the second component being configured to receive the first signal via the first connection of the connector,
wherein in response to receiving the first signal, the second component is configured to compare the first signal to a third signal and generate a result,
wherein second component is configured to transmit a signal to take an action based on the result,
wherein the second connection is configured to be in the first state in response to connecting the first component to the second component.

2. The system of claim 1, wherein the first component includes at least one of a field gate programmable array (FPGA) or an application-specific integrated circuit, and the second component includes non-volatile memory.

3. The system of claim 1, wherein the third signal is associated with an identifier stored in memory of the second component.

4. The system of claim 1, wherein the connector is configured to support a peripheral component interconnect express (PCIe) protocol.

5. The system of claim 1, wherein the second connection is configured to be in the first state in response to a reset of at least a portion of the system.

6. The system of claim 1, wherein the first connection includes a preset pin.

7. The system of claim 1, wherein the result comprises an indication of a match of the first signal with the third signal, and the action comprises enabling a feature of the system.

8. The system of claim 1, wherein the result comprises an indication of a mismatch of the first signal with the third signal, and the action comprises disabling a feature of the system.

9. The system of claim 1, wherein the result comprises an indication of a mismatch of the first signal with the third signal, and the action comprises displaying a notification on a display device.

10. The system of claim 1, wherein the second component is coupled to a device via a second connector.

11. The system of claim 1, wherein the first component includes a selector device, wherein the second connection being in the first state is configured to provide an input to the selector device for selecting the first signal and transmitting the first signal via the first connection.

12. The system of claim 11, wherein the selector device includes a multiplexor.

13. A method comprising:
generating, by a first component comprising a connector having a first connection, a first signal based on a second connection being in a first state;
transmitting the first signal via the first connection of the connector, wherein the first connection is configured to transmit a second signal based on the second connection being in a second state;
receiving, by a second component, the first signal, the second component being coupled to the first component via the connector; and
in response to receiving the first signal, comparing, by the second component, the first signal to a third signal, and generating a result, wherein a computing system is configured to take an action in response to the result,
wherein the second connection is configured to be in the first state in response to connecting the first component to the second component.

14. The method of claim 13, wherein the first component includes at least one of a field gate programmable array (FPGA) or an application-specific integrated circuit, and the second component includes non-volatile memory.

15. The method of claim 13, wherein the third signal is associated with an identifier stored in memory.

16. The method of claim 13, wherein the connector is configured to support a peripheral component interconnect express (PCIe) protocol.

17. The method of claim 13, wherein the second connection is in the first state in response to a reset of at least a portion of the computing system.

18. The method of claim 13, wherein the first connection includes a preset pin.

19. The method of claim 13, wherein the result comprises an indication of a match of the first signal with the third signal, and the action comprises enabling a feature of the computing system.

20. The method of claim 13, wherein the result comprises an indication of a mismatch of the first signal with the third signal, and the action comprises disabling a feature of the computing system.

21. The method of claim 13, wherein the result comprises an indication of a mismatch of the first signal with the third signal, and the action comprises displaying a notification on a display device.

22. The method of claim 13, wherein the second component is coupled to a device via a second connector.

* * * * *